United States Patent
Beaurepaire

(10) Patent No.: US 12,235,126 B2
(45) Date of Patent: Feb. 25, 2025

(54) METHOD AND APPARATUS FOR DETERMINING WINDOW DAMAGE INDICATORS

(71) Applicant: HERE GLOBAL B.V., Eindhoven (NL)

(72) Inventor: Jerome Beaurepaire, Nantes (FR)

(73) Assignee: HERE GLOBAL B.V., Eindhoven (NL)

(*) Notice: Subject to any disclaimer, the term of this patent is extended or adjusted under 35 U.S.C. 154(b) by 274 days.

(21) Appl. No.: 17/824,606

(22) Filed: May 25, 2022

(65) Prior Publication Data

US 2023/0384116 A1   Nov. 30, 2023

(51) Int. Cl.
| | |
|---|---|
| G01C 21/00 | (2006.01) |
| G01C 21/34 | (2006.01) |
| G06F 16/29 | (2019.01) |
| G06T 7/00 | (2017.01) |
| G06V 20/56 | (2022.01) |

(52) U.S. Cl.
CPC ..... G01C 21/3815 (2020.08); G01C 21/3461 (2013.01); G01C 21/3841 (2020.08); G01C 21/3878 (2020.08); G06F 16/29 (2019.01); G06T 7/0004 (2013.01); G06V 20/56 (2022.01); *G06T 2207/30252* (2013.01)

(58) Field of Classification Search
CPC ............ G01C 21/3815; G01C 21/3461; G01C 21/3841; G01C 21/3878; G06F 16/29; G06T 7/0004; G06V 20/56; G06Q 10/04
See application file for complete search history.

(56) References Cited

U.S. PATENT DOCUMENTS

| | | | | |
|---|---|---|---|---|
| 11,353,873 | B2* | 6/2022 | Lacaze | E01H 1/08 |
| 11,532,050 | B1* | 12/2022 | Farnsworth | G06Q 40/08 |
| 2018/0201257 | A1* | 7/2018 | Dudar | B60W 10/184 |
| 2019/0170662 | A1* | 6/2019 | Hansen | G06T 7/0004 |
| 2020/0013160 | A1* | 1/2020 | Francis | B60R 25/305 |
| 2021/0342999 | A1 | 11/2021 | Xu | |
| 2021/0350713 | A1* | 11/2021 | Van Meeteren | H04W 4/40 |
| 2022/0398878 | A1* | 12/2022 | Michelfeit | G01N 29/4445 |
| 2023/0019606 | A1* | 1/2023 | Laskowski | G07C 5/006 |

FOREIGN PATENT DOCUMENTS

| | | |
|---|---|---|
| CN | 112950566 A1 | 6/2021 |
| CN | 112465816 B | 8/2021 |
| WO | WO2018055340 A1 | 3/2018 |
| WO | WO2020260854 A1 | 12/2020 |

OTHER PUBLICATIONS

Augustin Marty, "What's Computer Vision?," Deepomatic, Mar. 11, 2021.

\* cited by examiner

*Primary Examiner* — Ig T An
(74) *Attorney, Agent, or Firm* — Jeffrey R. Moisan; HERE GLOBAL B.V.

(57) ABSTRACT

A method, apparatus, and user interface for a vehicle window damage detection system comprising obtaining image data of at least one vehicle window and determining a window damage indicator based on the obtained image data, identifying one or more road segments, and associating the determined window damage indicator with one or more identified road segments to update a map layer of a geographic database.

14 Claims, 7 Drawing Sheets

METHOD AND APPARATUS FOR DETERMINING WINDOW DAMAGE INDICATORS

TECHNOLOGICAL FIELD

An example embodiment relates generally to a method, apparatus, computer readable storage medium, user interface and computer program product for determining window damage indicators and, more particularly, for determining vehicle window damage indicators based upon image data.

BACKGROUND

Modern vehicles include a plurality of different types of sensors for collecting a wide variety of information. These sensors include location sensors, such as global positioning system (GPS) sensors, configured to determine the location of the vehicle. Based upon the location of the vehicle, a variety of navigational, mapping and other services may be provided for manually driven vehicles as well as the provision of navigation and control of autonomous or semi-autonomous vehicles. Other examples of sensors include cameras or other imaging sensors that capture images of the environment including objects in the vicinity of the vehicle. The images that are captured may be utilized to determine the location of the vehicle with more precision. A more precise determination of the vehicle location may be useful in conjunction with the provision of navigational, mapping and other informational services for a manually driven vehicle. Additionally, the more precise determination of the vehicle location may provide for the improved navigation and control of an autonomous or semi-autonomous vehicle by taking into account the location of other objects, such as other vehicles, in proximity to the vehicle carrying the sensors.

The sensors on board vehicles therefore collect a wide variety of data that may be utilized for various purposes. However, these sensors currently on-board vehicles do have limitations and do not provide all of the different types of information that would be useful in various applications. One specific example of a current limitation is in the generation of route guidance and automated vehicle controls in certain scenarios.

BRIEF SUMMARY

A method, apparatus, computer readable storage medium, user interface, and computer program product are provided in accordance with an example embodiment to determine and predict window damage indicators. In this regard, the method, apparatus, computer readable storage medium, and computer program product of an example embodiment may utilize image data collected from vehicles and their surroundings to determine and predict one or more window damage indicators. The reliance upon the collection and analysis of image data may supplement the information provided by other sensors and allow for the provision of different information, such as the type of window damage which is useful for a variety of applications. As an example, the determination of the location of a window damage indicator may be useful in relation to the provision of more relevant information. Such uses include routing information, alerts, etc. By way of another example, the identification and/or prediction of window damage indicators may also be useful for federal, state, local or other governmental or regulatory officials that design and maintain the roads and sidewalks.

One embodiment may be described as a method for providing a vehicle window damage detection system comprising obtaining image data of at least one vehicle window and determining a window damage indicator based on the obtained image data. The method then further comprises identifying one or more road segments and associating the determined window damage indicator with one or more identified road segments to update a map layer of a geographic database. The method above may further comprise receiving an indication of a location of the vehicle and identifying one or more road debris proximate the location of the vehicle. This embodiment and others may further comprise determining a confidence interval associated with the window damage indicator and updating a map layer with the confidence interval. This embodiment and others may further comprise updating the confidence interval associated with the determined window damage indicator based at least in part on the severity of damage done to a vehicle windshield.

This method may further comprise identifying at least one additional window damage indicator based on road segments similarly situated to the previously identified road segments. This method may yet further comprise providing an alert and/or route guidance in response to the determined window damage indicator to at least one end user device. The image data utilized by this method may be obtained from an onboard vehicle camera system.

In another embodiment, the invention may be described as an apparatus configured to predict and/or determine window damage indicators, the apparatus comprising at least one processor and at least one memory storing computer program code, the at least one memory and the computer program code configured to, with the processor, cause the apparatus to at least obtain image data of at least one vehicle window and determine at least one window damage indicator based on the obtained image data. The apparatus may then identify one or more road segments and associate the determined window damage indicator with one or more identified road segments to update a map layer of a geographic database. The at least one memory and the computer program code may be further configured to, with the processor, cause the apparatus to receive an indication of a location of the vehicle, and wherein the at least one memory and the computer program code are configured to, with the processor, cause the apparatus to identify one or more road debris proximate the location of the vehicle.

In some embodiments, the apparatus may further comprise determining a confidence interval associated with the determined window damage indicator location and updating a map layer with the confidence interval. This embodiment may also further comprise updating the confidence interval associated with the determined window damage indicator based at least in part on the severity of damage done to a vehicle windshield. This apparatus and others may also be described as featuring at least one memory and computer program code which are configured to, with the processor, cause the apparatus to obtain the image data via a vehicle camera system. This apparatus and others may also utilize the at least one memory and the computer program code to, with the processor, cause the apparatus to generate route guidance and/or alerts.

Yet another embodiment may be described as a user interface for providing a user with a route to a destination, comprising the steps of receiving input upon a user device from the user that indicates a destination; accessing a geographic database to obtain data that represent roads in a region in which the user device is operating; determining a route to the destination by selecting road segments to form a continuous path to the destination; and displaying the determined route or portion thereof to the user, wherein the determined route avoids at least one road segment in response to a window damage indicator. This user interface may determine a route for the vehicle which avoids one or more window damage indicators proximate to the location of the vehicle. The window damage indicator may be derived at least in part from image data obtained via a vehicle camera system. The user interface may also provide an alert in response to a determined window damage indicator. All this information may be displayed on an end user device (e.g., smartphone, tablet, etc.) and/or in a motor vehicle (e.g., built-in display).

Also, a computer program product may be provided. For example, a computer program product comprising instructions which, when the program is executed by a computer, cause the computer to carry out the steps described herein.

BRIEF DESCRIPTION OF THE DRAWINGS

Figure 1:
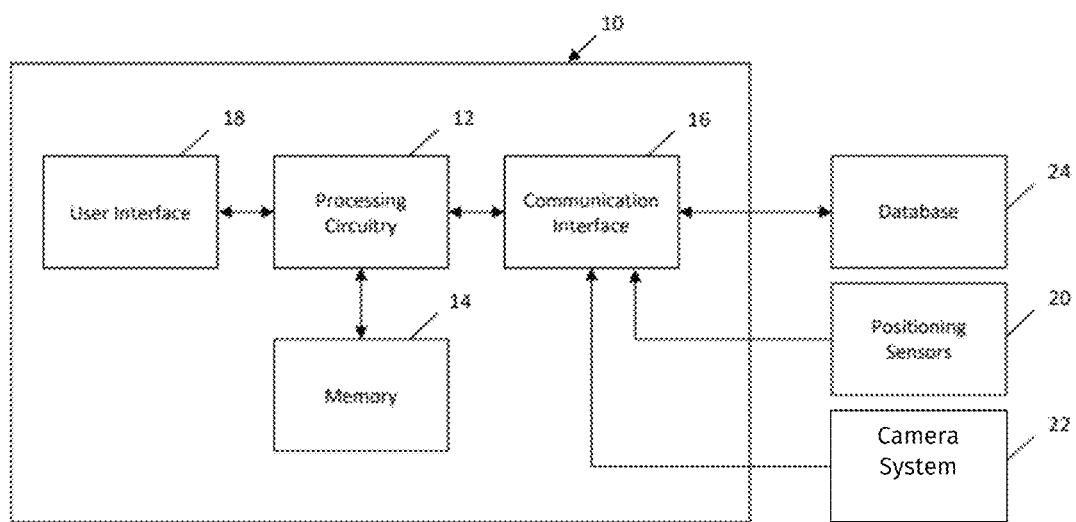
Figure 2:
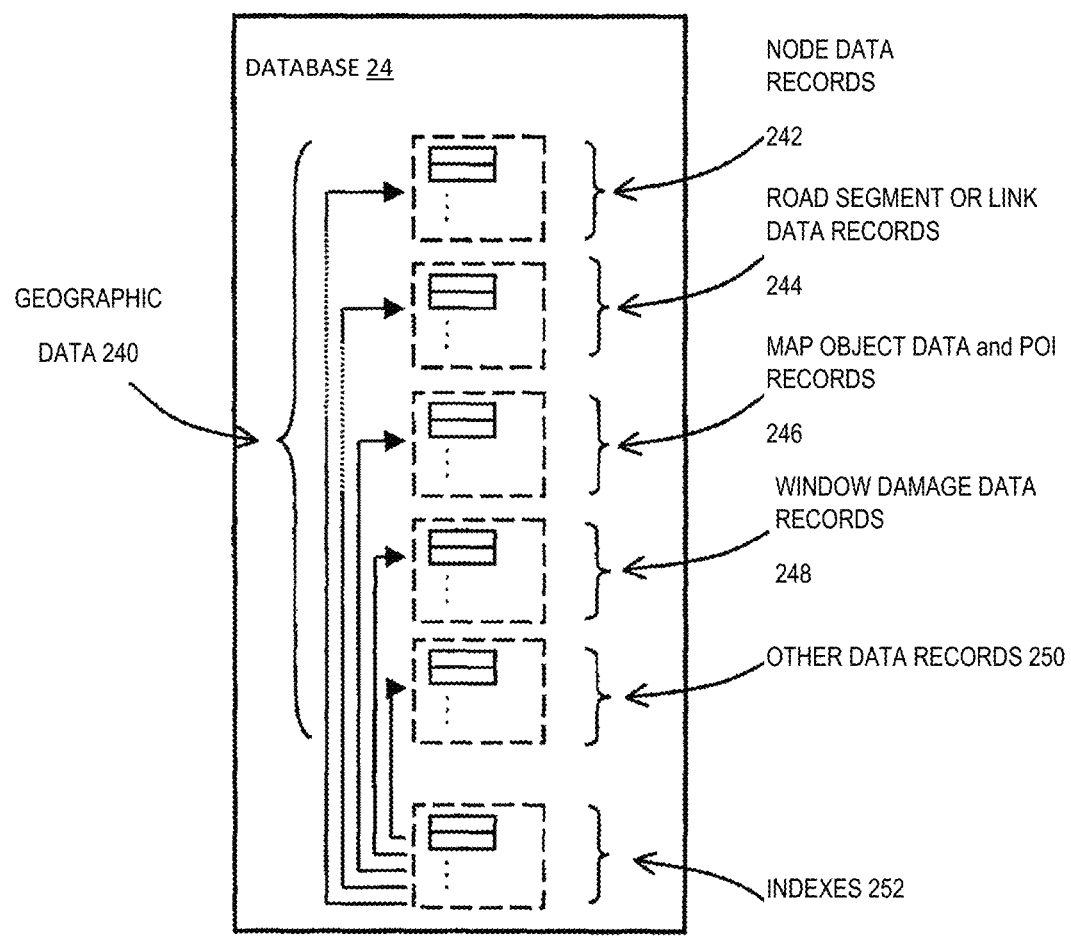
Figure 3A:
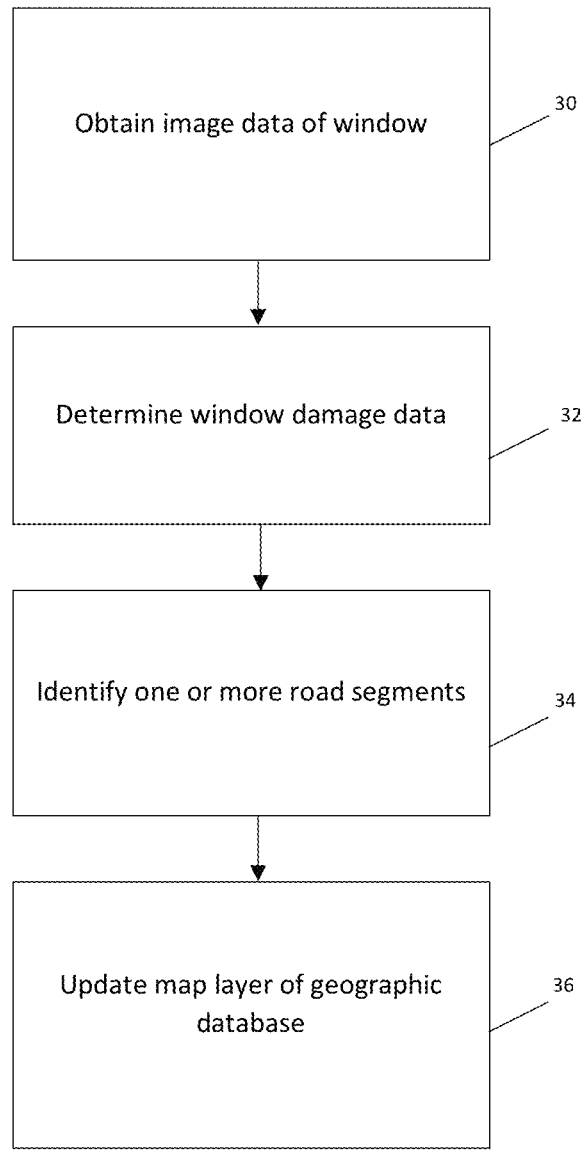
Figure 3B:
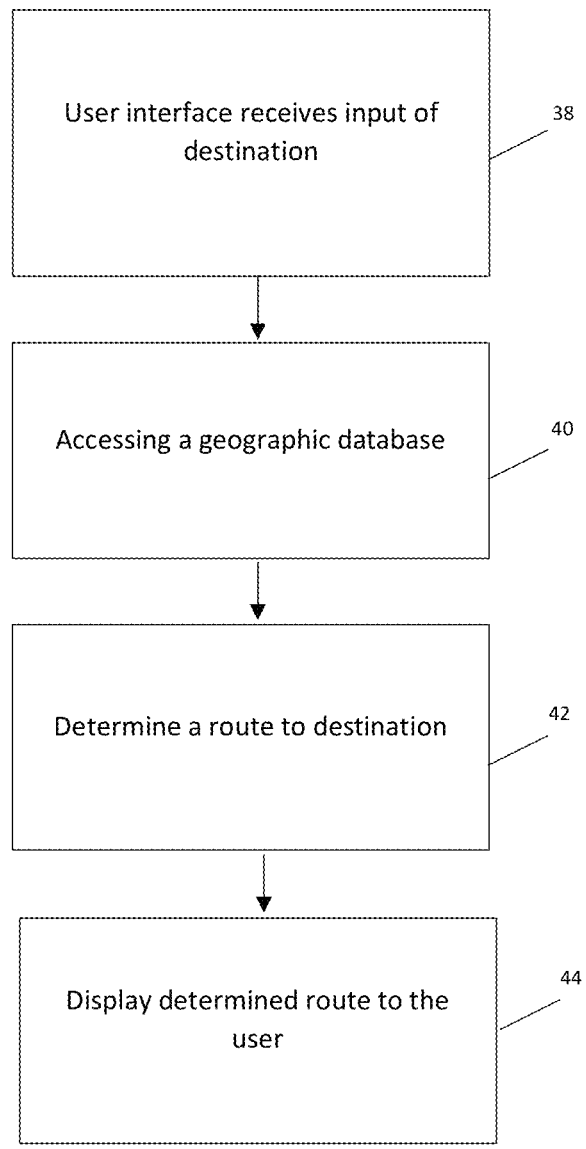
Figure 3C:
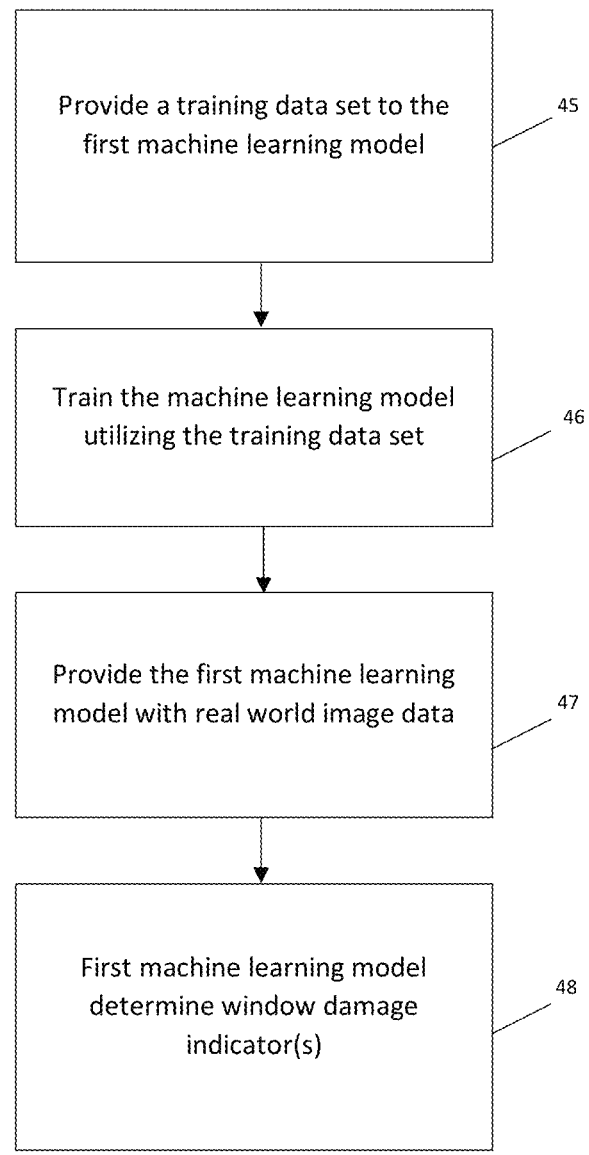
Figure 4:
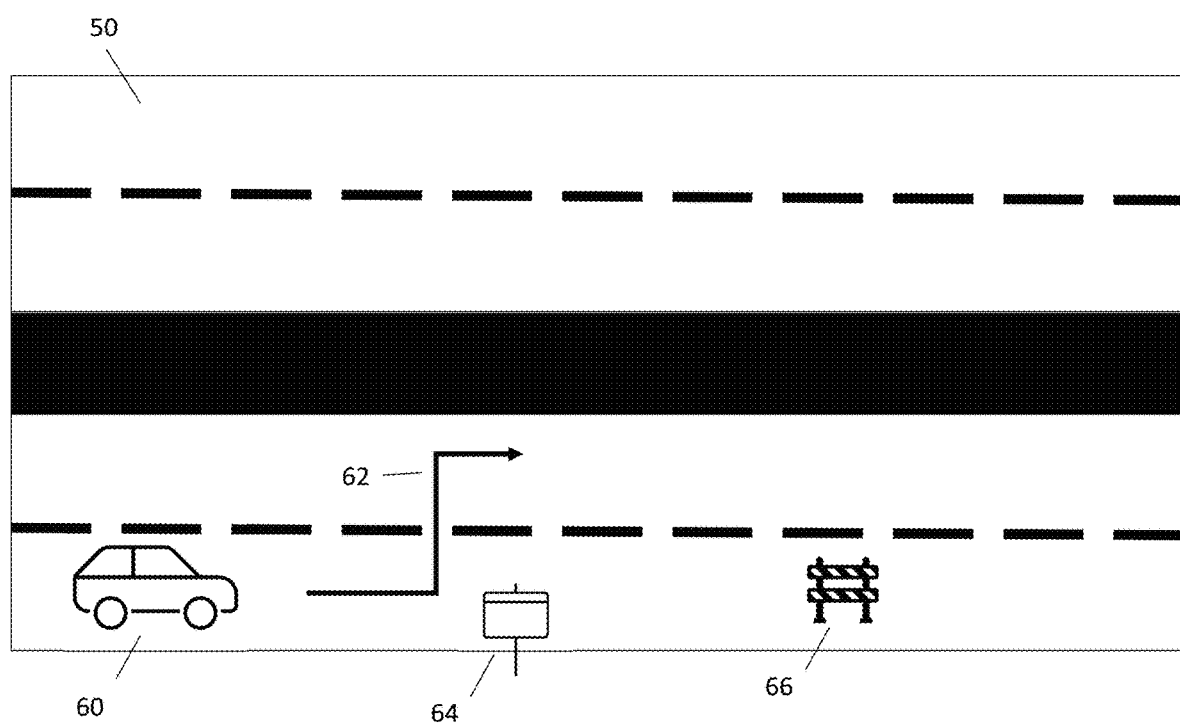
Figure 5:
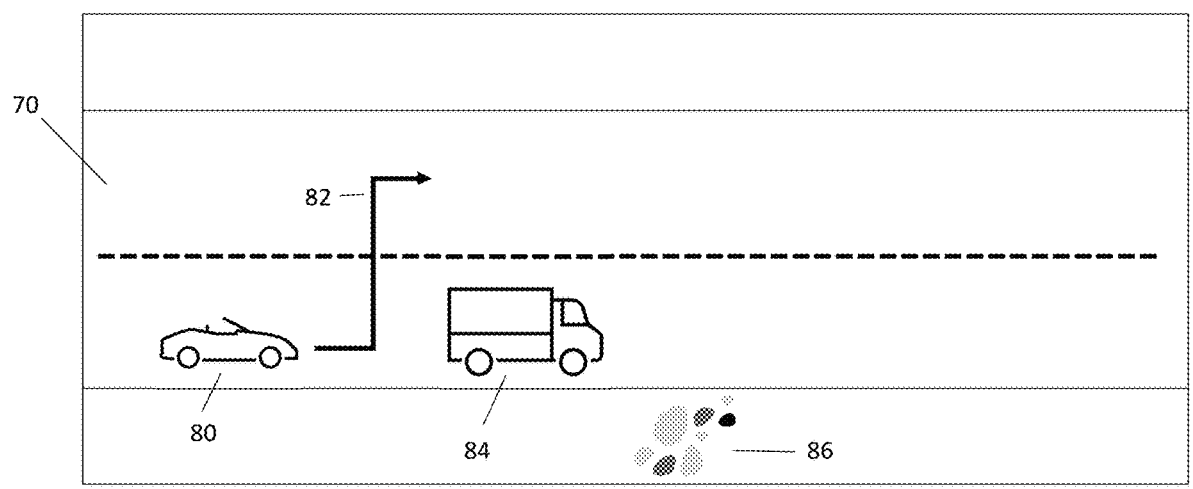

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment;

FIG. 2 is a block diagram of a geographic database of an example embodiment of the apparatus;

FIG. 3A is a flowchart illustrating the operations performed, such as by the apparatus of FIG. 1, in order for an apparatus to identify a window damage indicator;

FIG. 3B is a flowchart illustrating the operations performed, such as by the apparatus of FIG. 1, in order to provide a graphical user interface and/or functions thereof;

FIG. 3C is a flowchart illustrating the operations performed, such as by the apparatus of FIG. 1, in order to train machine learning models to predict window damage indicators;

FIG. 4 is a graphical representation of a road upon which a passenger car is present with a road sign proximate to the road;

FIG. 5 is another graphical representation of a road upon which a passenger car is present with road debris proximate to the road.

DETAILED DESCRIPTION

Some embodiments of the present invention will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A system, method, apparatus, user interface, and computer program product are provided in accordance with an example embodiment to determine a window damage indicator based on image data. In order to determine the window damage indicator, the system, method, apparatus, non-transitory computer-readable storage medium, and computer program product of an example embodiment are configured to obtain image data of at least one vehicle, more specifically a window of a vehicle and determine a window damage indicator based on the obtained image data. The image data may be obtained from a vehicle camera system, traffic cameras, etc. The system in this embodiment may then identify one or more road segments and associate the determined window damage indicator with one or more related road segments to update a map layer of a geographic database.

The system, apparatus, method, etc. described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, etc. configured to detect and predict window damage may similarly be embodied by the same or different server, computer workstation, distributed network of computing devices, personal computer, or other type of computing device.

Alternatively, the system, etc. may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

Regardless of the manner in which the system, apparatus, etc. is embodied, however, an apparatus 10 includes, is associated with, or is in communication with processing circuitry 12, memory 14, a communication interface 16 and optionally a user interface 18 as shown in FIG. 1. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally, or alternatively, the memory can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally, or alternatively, the processing circuitry can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively, or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., one or more map objects, POI data, etc.) generated and/or employed by the processing circuitry 12. Additionally, or alternatively, the communication interface can be configured to communicate in accordance with various wireless protocols including Global System for Mobile Communications (GSM), such as but not limited to Long Term Evolution (LTE), 3G, 4G, 5G, 6G, etc. In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally, or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to vehicle or vehicle to infrastructure wireless links.

In certain embodiments, the apparatus 10 can be equipped or associated with one or more positioning sensors 20, such as one or more GPS sensors, one or more accelerometer sensors, one or more light detection and ranging (LiDAR) sensors, one or more radar sensors, one or more gyroscope sensors, and/or one or more other sensors. Any of the one or more sensors may be used to sense information regarding movement, positioning and location, and/or orientation of the apparatus for use, such as by the processing circuitry 12, in navigation assistance and/or autonomous vehicle control, as described herein according to example embodiments.

In certain embodiments, the apparatus 10 may further be equipped with or in communication with one or more camera systems 22. In some example embodiments, the one or more camera systems 22 can be implemented in a vehicle or other remote apparatuses.

For example, the one or more camera systems 22 can be located upon a vehicle or proximate to it (e.g., traffic cameras, etc.). While embodiments may be implemented with a single camera such as a front facing camera in a consumer vehicle, other embodiments may include the use of multiple individual cameras at the same time. A helpful example is that of a consumer sedan driving down a road. Many modern cars have one or more cameras installed upon them to enable automatic braking and other types of assisted or automated driving. Many cars also have rear facing cameras to assist with automated or manual parking. In one embodiment of the current system, apparatus, method, etc. these cameras are utilized to capture images of vehicles, road signs, streets, etc. as a sedan, etc. travels around. The system, apparatus, etc. takes these captured images (via the camera systems 22) and analyzes them to determine if there are window damage indicators present on a certain street. Various types of roadwork and other sources of road debris may be detected via any functional means.

The data captured concerning the vehicles and windows present may also come from traffic cameras, security cameras, or any other functionally useful source (e.g., historic data, satellite images, websites, etc.).

The analysis of the image data of the vehicle(s) may be carried out by a machine learning model. This model may utilize any functionally useful means of analysis to identify window damage indicators on a given roadway, road segment, or in a general area. The system, in this embodiment, may also examine relevant proximate points of interest (POIs), map objects, road geometries, animate objects, road debris, etc. which could suggest the presence of potential window damage indicators.

The locations of the vehicle, road sign(s), road debris, any relevant points of interest (POIs), and other types of data which are utilized by various embodiments of the apparatus may each be identified in latitude and longitude based on a location of the vehicle using a sensor, such as a GPS sensor to identify the location of the vehicle. The POIs, map objects, infrastructure, etc. identified by the system may also be detected via the camera systems 22.

In certain embodiments, information detected by the one or more cameras can be transmitted to the apparatus 10, such as the processing circuitry 12, as image data. The data transmitted by the one or more cameras can be transmitted via one or more wired communications and/or one or more wireless communications (e.g., near field communication, or the like). In some environments, the communication interface 16 can support wired communication and/or wireless communication with the one or more camera sensors.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Turning to FIG. 2, the map or geographic database 24 may include various types of geographic data 240. This data may include but is not limited to node data 242, road segment or link data 244, map object and point of interest (POI) data 246, window damage data records 248, or the like (e.g., other data records 250 such as traffic data, sidewalk data, etc.). Other data records may include computer code instructions and/or algorithms for executing a machine learning model that is capable of providing a prediction of adverse road locations. The other records may further include verification data indicating: (1) whether a verification of a prediction for an adverse road location was conducted; (2) whether the verification validates the prediction; or (3) a combination thereof.

In one embodiment, the following terminology applies to the representation of geographic features in the database 24. A "Node"—is a point that terminates a link, a "road/line segment"—is a straight line connecting two points, and a "Link" (or "edge") is a contiguous, non-branching string of one or more road segments terminating in a node at each end. In one embodiment, the database 24 follows certain conventions. For example, links do not cross themselves and do not cross each other except at a node. Also, there are no duplicated shape points, nodes, or links. Two links that connect each other have a common node.

The map database 24 may also include cartographic data, routing data, and/or maneuvering data as well as indexes 252. According to some example embodiments, the road segment data records may be links or segments representing roads, streets, or paths, as may be used in calculating a route or recorded route information for determination of one or more personalized routes. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 24 may be maintained by a content provider e.g., the map data service provider and may be accessed, for example, by the content or service provider processing server. By way of example, the map data service provider can collect geographic data and dynamic data to generate and enhance the map database and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database 24 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 24 may be a master geographic database, but in alternate embodiments, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The records for window damage data 248 may include various points of data such as, but not limited to: type of damage done to a window, damage source, location, time/date information, other vehicles or objects present at the time of damage, etc.

FIG. 3A is a flowchart which demonstrates how the apparatus 10 identifies window damage indicators for vehicles. More, fewer, or different acts or steps may be provided. At a first step (block 30) the apparatus may obtain one or more images of at least one vehicle window. The images may be obtained from the camera of an end user device such as a smart phone, the camera system of a vehicle, or even traffic cameras, etc. The apparatus may be trained to analyze the image data (see FIG. 3C) via machine learning model or any other functionally capable means to identify window damage indicators. The images may include but are not limited to actual images or audio data of vehicle window damage or the presence of various road debris which might damage windows. Vehicle windows may be damaged by any number of road debris including but not limited to: particulates, dust, dirt, sand, mud, asphalt, concrete, pebbles, rocks/stones/boulders, particles of road salt and other deicers, litter, food waste, animal feces/manure, furniture, electrical appliances, and other items of garbage, trash, rubbish and refuse, broken glass, nails, screws, and other often sharp objects, car parts, vehicle wreck debris, damaged tire treads, bicycles parts, roof racks, misplaced luggage, lumber, construction materials, pallets, crates, and other solid objects accidentally or deliberately dropped from moving vehicles, animal corpses (roadkill), broken glass, plastics, and other solid materials from vehicles, ice, sleet, hail, plant branches, sticks, twigs, seeds, nuts, etc.

The presence of the listed road debris above (and many others) may damage vehicle windows and thus their presence, when detected proximate to a road link by the apparatus 10, may be noted as a window damage indicator. Some activities, such as road work projects, may commonly generate road debris and the apparatus 10 may also note the presence of such activities as additional and/or separate window damage indicators. One example could be the presence of road work signs proximate to a roadway. The presence of such a road sign might indicate there is a potential for rocks, pebbles, etc. on the given roadway or proximate to it. The presence of road debris, road signs, etc. can be confirmed by image data captured by passing vehicles capturing ground truth data and images for the given roadway. The image data might also be captured by traffic cameras, etc.

Once these images are obtained, the apparatus may then determine window damage data at another step (block 32). The window damage data may be obtained from the image data above and other sources (e.g., online postings about upcoming construction, vehicle clash alerts, etc.) and the data may include but is not limited to the type of window damage which occurred, the time it occurred, location the damage occurred (via GPS), etc.

For example, some public works project only occur at specified times. During these times, window damage might occur in the form of a cracked windshield from gravel kicked up by the presence of the road construction machinery. The apparatus 10 may note the cracked windshield (versus a chip, full break, etc.) and the area which it occurred. There are various types of actual window damage which might be accounted for by the apparatus 10 including but not limited to: chips, pits, bulls-eye pattern cracks, star pattern cracks, linear cracks, curved cracks, circular cracks, fully shattered/spider webbed, and combinations therein. It should be noted all of the information mentioned above may serve as both window damage data and/or window damage indicators.

Once a damaged window has been identified, the apparatus may then identify one or more road segments (block 34) upon which the window damage occurred. The identification of the relevant road segments may be done via a vehicle's onboard GPS (see FIG. 1) or any other functional means. Once identified, the apparatus may then update a map layer of a geographic database (block 36). The updating of the map layer may include but is not limited to identifying/associating locations of the identified relationships with certain road segments and then providing a data indicator or flag to mark that road segment or attribute (metadata) that can be used as an identifier when needed to access or retrieve the road segments for various navigation functions. This data can also be used to generate alerts and analyze other similarly situated road segments for the potential risk, route changes, etc. a given window damage indicator might pose. The road segment data may also include sidewalk data or areas included in/associated with the road segment records or the road segment records may represent path records such as sidewalks, hiking trails, etc.

Turning to FIG. 3B, the apparatus 10 may support a user interface 18 (as shown in FIG. 1). More, fewer, or different acts or steps may be provided. At a first step, the user interface may receive an input of destination from an end user (block 38). This input of destination may be received via an end user device graphical user interface (GUI) running upon a smartphone, tablet, integrated vehicle navigation system, etc. Once a destination is input, the apparatus may then access a geographic database (block 40) and determine a route to the input destination (block 42). The determined route may, in some embodiments, avoid at least one road segment in response to a determined window damage indicator. As mentioned above, the determination of indicator may be based on any functionally capable means including identification of an actual damaged window and road work signs, presence of road debris, and/or various other data sources.

Notwithstanding how the apparatus generates a determination of a window damage indicator, this information may then be used to route the end user towards or away from certain road segments when generating a route. The route determined by the apparatus 10 may then be displayed to then end user (block 44) via the same or a different user interface. The apparatus can take any number of additional actions (or in place of) what is called for in block 44. For example, the apparatus may provide audio guidance instead of a visual display. The navigation instructions may also be provided to an autonomous vehicle for routing (for example, without any display to the user). It should also be noted the UI can be run by a processor and stored upon one or more types of memory in some embodiments.

Referring now to FIG. 3C, the operations performed, such as by the apparatus 10 of FIG. 1, in order to train a machine learning model to detect/predict window damage indicators. More, fewer, or different acts or steps may be provided. As shown in block 45, the apparatus includes means, such as the processing circuitry 12, memory 14, the communication interface 16 or the like, for providing a training data set that includes a plurality of training examples. In this regard, the training data set may be provided by access by the processing circuitry of the training data set stored by the memory. Alternatively, the training data set may be provided by access by the processing circuitry to a database 24 or other memory device that either may be a component of the apparatus or may be separate from, but accessible to the apparatus, such as the processing circuitry, via the communication interface. It should be noted the system apparatus may utilize more than one machine learning model to carry out the steps described herein.

In accordance with an example embodiment, the apparatus 10 also includes means, such as the processing circuitry 12, the memory 14 or the like, configured to train a machine learning model utilizing the training data set (block 46). The machine learning model, as trained, is configured to detect and predict window damage indicators. The prediction may be based, at least in part, upon image data of damaged windows and/or road debris.

The apparatus 10, such as the processing circuitry 12, may train any of a variety of machine learning models to identify window damage indicators based upon a single or plurality of images. Examples of machine learning models that may be trained include a decision tree model, a random forest model, a neural network, a model that employs logistic regression or the like. In some example embodiments, the apparatus, such as the processing circuitry, is configured to separately train a plurality of different types of machine learning models utilizing the same training data including the same plurality of training examples. After having been trained, the apparatus, such as the processing circuitry, is configured to determine which of the plurality of machine learning models predicts window damage indicators based upon image data with the greatest accuracy. The machine learning model that has been identified as most accurate is thereafter utilized.

In one example, the machine learning model may be a deep learning neural network computer vision model that utilizes image data of damaged windows, road debris, etc. to automatically identify them. A training example for this first machine learning model may also include image data of known types of damaged windows and road debris. Known types of window damage might include but is not limited to chips, pits, bulls-eye pattern cracks, star pattern cracks, linear cracks, curved cracks, circular cracks, fully shattered/ spider webbed, and combinations therein. Various images of different types of damaged windows and/or the road debris which caused the damage may be provided to the machine learning model to train and improve its accuracy.

In some example embodiments, a balance or trade-off between the accuracy with which the window damage indicators are identified and the efficiency with which the machine learning model identifies them is considered. For example, a first set of images may produce the most accurate identification, but a second combination of images may produce an identification of relevant objects (e.g., damaged windows, road debris, etc.) that is only slightly less accurate, but that is significantly more efficient in terms of its prediction. Thus, the second combination of images that provide for sufficient, even though not the greatest, accuracy, but does so in a very efficient manner may be identified by the apparatus 10, such as the processing circuitry 12, as the preferred images to be provided to the machine learning model to identify window damage indicators in subsequent instances.

In some embodiments, a training example also includes information regarding a map object, such as a map object that is located at the location at which the image data was captured. One example of a map object is a bridge, and another example of a map object is a railroad crossing. A wide variety of other map objects may exist including, for example, manhole covers, transitions between different types of road surfaces, medians, parking meters, various forms of infrastructure, or the like. As described in more detail below, the map object that is included in a training example may be determined or provided in various manners. For example, the map object may be defined, either manually or automatically, by reference to a map database 24 and identification of a map object at the same location or at a location proximate, such as within a predefined distance of, the location at which the corresponding image data was captured. The training example may also include point of interest (POI) data. A POI may be something like a restaurant, park, school, bus stop, etc. Relevant POIs may also be defined, either manually or automatically, by reference to a map database 24 and identification of a POI at the same location or at a location proximate, such as within a predefined distance of, the location at which the corresponding image data was captured. The location of relevant POIs and/or map objects may be found by GPS coordinates or any other functionally capable means.

Yet other various types of data may also be utilized when training the machine learning model including map geometry data, historic data, etc. Ground truth data may also be utilized with a combination of these different features for supervised machine learning.

Once trained, the machine learning model may then be provided various real-world data as mentioned in block 47 and used to determine window damage indicators based on the various data points above and others (block 48).

An example of the apparatus 10 detecting and/or predicting a window damage indicator is that of a car driving along a 2-lane highway. As the car drives down the road, it comes upon a sign which says, "Road Construction Ahead 2 Miles". The apparatus 10 will capture images of the road sign via the car's camera system 22. The image data captured is provided to the machine learning model which, when trained, may identify the road sign as well as any road debris objects in proximity to the roadway (e.g., rocks, etc.).

One such road debris object, in this example, could be gravel on the roadway, the shoulder, or otherwise proximate to the roadway, generated from road construction (or present for any other reason such as a spill). The type of road debris (e.g., gravel from road construction) determination and the relevant other information identified may be provided to the machine learning model. The machine learning model will then be able to predict if and where window damage might occur on a given roadway. In this example, since the car has passed a road sign indicating roadwork is occurring and there is confirmed road debris present in the form of gravel, the apparatus 10 may predict that there is a high likelihood window damage might occur.

The machine learning model in this example makes its determination based on a combination of specific factors (map data, image data, etc.), and the model predicts the potential for window damage because of specific factors in a specific combination or configuration are present. The factors in this example may include the image data of the road sign and road debris (together in one image or as separate images), image data of the roadways, image data of other objects proximate to the roadway (e.g., dumpsters, debris, construction materials, construction vehicles, etc.) as well as time of day data, historic data, etc. This set of data, provided to the model, matches (or is like) the factors used in the training process (in this example). This allows the machine learning model to predict if window damage is likely to occur location given the location, time of day, vehicles, and road debris present, etc.

The determination of the presence of the potential for window damage (window damage indicator(s)) can then be utilized in various ways. The apparatus 10 may alert the driver of the sedan (and other end users) via graphical user interface that there could be a risk ahead. The apparatus may also update one or more map layers and/or databases to account for this determination. In some embodiments, the identified location of potential window damage may be used to activate autonomous or highly assisted driving features. For example, if the sedan discussed above had self-driving capabilities the apparatus 10 could activate the self-driving mode in response to the window damage indicators to avoid potential damage caused by them (and improve safety by avoiding veering by the end user in response to road debris striking their window).

The determined window damage indicator(s) may be utilized in other ways. For example, the apparatus 10 may provide to the end user updated route guidance which avoids certain areas with the potential for window damage from road construction debris. Continuing with the example above, the apparatus 10 may look at existing map data to determine a better route which avoids the construction all together.

As mentioned before, the apparatus 10 features one or more machine learning models. This model and other data may be used by the apparatus 10 to not only analyze real time driving situations as mentioned above but also examine existing map data to identify other similarly situated roadways. These similar roadways will have similar POIs, map objects, etc. So, for example, if there was another roadway with gravel proximate to it (but no road construction sign), the apparatus 10 may be able to detect such a similar roadway and provide alerts, route guidance, etc. to an end user to avoid the potential damage risk.

Turning to FIG. 4, some of the examples discussed above are illustrated. Specifically, a sedan 60 is shown driving down a roadway 50. On the roadway 50 there is a road sign 64 and a road works project 66 ahead (proximate to the roadway). As shown in FIG. 4, the sedan 60 is utilizing the apparatus 10 to predict the potential for window damage. The apparatus 10 identifies the road sign 64 via images from the camera system 22, traffic cameras, etc. and feeds those images into the machine learning model which determines the type of road sign present (e.g., a road construction sign, electronic sign, speed limit sign, etc.). The apparatus then takes this data along with relevant other information such as the image data of the actual road works/construction project 66 and feeds it back to the machine learning model (or to another model, algorithm, etc.) to determine if there is likely potential for window damage on the given roadway.

It should be noted that the sedan 60 in this example represents any vehicle. Such vehicles may be standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, a graphical user interface (GUI) may be integrated in the vehicle, which may include assisted driving vehicles such as autonomous vehicles, highly assisted driving (HAD), and advanced driving assistance systems (ADAS). Any of these assisted driving systems may be incorporated into the GUI. Alternatively, an assisted driving device may be included in the vehicle. The assisted driving device may include memory, a processor, and systems to communicate with the GUI. In one embodiment, the vehicle may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In this example, there is a road construction project 66 obstructing the roadway but the road construction equipment, road debris, refuse, etc. may also be adjacent to the roadway 50 in some embodiments. If such debris, etc. is present proximate to the roadway the apparatus 10 may detect it via traffic cameras, vehicle cameras, etc. The apparatus 10 uses all this information (e.g., data from the road sign, road construction refuse present, etc.) via the one or more machine learning models to determine if there are any window damage indicators present. In this example, it is determined by the apparatus 10 that there is a high likelihood of such window damage ahead of the sedan 60. This conclusion may be based on not only the presence of the road sign 64 but also the road work project 66 in the actual roadway 50, both of which are considered window damage indicators in this example. In some embodiments, the apparatus 10 may extract information from the road sign 64 by use of OCR and/or NLP to improve accuracy.

In one embodiment, the apparatus 10 may use optical character recognition ("OCR") in conjunction with one or more databases (see FIG. 2) to determine text of a geographic object. Additionally, the apparatus 10 may compare features or components (such as invariant components relating to a road sign) in or from images to reference features or components in one or more reference databases (or data libraries) to detect a symbol or feature (such as a road works sign diamond symbol). The apparatus 10 may then record (in a database) the determined text, the identified symbols and/or graphics thereof, and/or other features or determinations. For example, the road sign 64 in this case might feature text which says "ROAD WORK AHEAD 500 FEET" along with being a traditional orange roadworks sign. The apparatus 10 can extract this text along with the shape and color of the sign to determine its meaning and content, at least in part, by comparing the current sign to a database of reference information.

As mentioned above, OCR may be used to extract the information from a road sign 64 and natural language processing (NLP) technologies may be used in conjunction with the OCR tools to aid the apparatus 10 in analyzing various signs. NLP may be used in some embodiments to address issues around word segmentation, word removal, and summarization to determine the relevancy of the various parsed data. In various embodiments, semantics of the various parsed data are determined based on a vocabulary model in a grammar module. For example, in various embodiments, probabilistic latent semantic indexing (pLSI) or Latent Dirichlet allocation (LDA) may be used to deduce semantics from words in the extracted road sign text and determine their relevancy. Such methods can be used to derive text and topics from a set of road work terms.

Based off this information, the apparatus may provide to the driver of the sedan 60 an alert (e.g., a high-risk alert) along with route guidance 62 to avoid the area with window damage indicator(s) related to the road construction project 66. The route guidance 62 provided by the apparatus 10 is shown as an arrow which represents a suggested way to avoid the project (e.g., drive around it in the other lane to avoid gravel and other refuse flying into the vehicle's windows window). This data could also then be used by the apparatus to provide an alert or route guidance to other user(s) in the area. The suggested route change mitigates the risk of window damage while in some other examples, automatic braking, etc. may be applied by the apparatus 10 to avoid higher risk situations.

Route guidance may include various guidance options, visual and/or audio. For example, visual guidance on how and when to change lanes or audio guidance relaying the same information. Automatic driver controls like those for an autonomous vehicle (e.g., an automatic lane change that can include an explanation to the passenger on what is happening), etc. The guidance itself can include the alert messages as mentioned above so the generation of alerts and route guidance can be the same function. When calculating the route and route guidance, metadata such as a data flag or attribute of road segments are taken into consideration when forming different suggested routes and one or more segments are excluded from these routes when it is determined (by the apparatus) that one or more window damage indicators is associated with the omitted segment(s).

In some embodiments, apparatus 10 may generate a confidence interval/score which reflects the likelihood a given roadway or navigable link contains window damage indicator(s). In the example above, the apparatus 10 can read the road sign 64 and extract relevant information such as the general area of road work (e.g., that there is road work ahead in 0.5 miles, etc.). From the presence of this sign, the confidence score for the likelihood of a window damage indicator on the given roadway may be increased from 0 to 0.25. The apparatus 10 may then receive additional information from other sources (e.g., other cars, traffic cameras, traffic alerts, etc.) which can increase or decrease this confidence score. For example, if there is image data of the actual road, which is clear of debris, the apparatus 10 might lower the confidence score for the likelihood of window damage indicators on the roadway from 0.25 to 0.1. Alternatively, if the road construction presence is confirmed by the presence of an actual road works project 66 on a given roadway (e.g., lanes blocked, equipment present, road debris, refuse, etc.) the confidence interval may be boosted up to 0.75 as the equipment's presence may increase the risk of window damage. This confidence interval can be updated in real time and is useful for numerous tasks including keeping an accurate record of potential sources of window damage indicators (e.g., the road construction project) as they move around/along a roadway.

FIG. 5 illustrates another example embodiment. Specifically, a convertible 80 is shown driving down a different roadway 70. Next to the roadway 70 there is a large truck (e.g., semitruck) 84 ahead of the convertible 80. As shown in FIG. 5, the convertible 80 is utilizing the apparatus 10 to predict if are window damage indicators in the area. The apparatus 10 identifies the large truck 84 as well as road debris 86 (e.g., loose gravel) via images from the camera system 22, traffic cameras, etc. and feeds those images into a machine learning model which determines the presence of window damage indicators. The apparatus 10 then takes this data along with relevant other information and generates alerts, routing information, etc.

In this example, the apparatus 10 may examine the presence of the loose gravel road debris 86 along with the presence of the large truck 84. The large truck takes up more space on the given roadway 70 and its size relative to the convertible means there is a higher likelihood for the truck to kick the loose gravel into the convertible's windows. The size of the truck also means it may be more likely to come into contact with the loose gravel as the truck passes by said gravel. The apparatus 10 may examine all these factors and others to determine the risk of window damage for the convertible and alert the drivers of both vehicles based on the determined window damage indicators.

As mentioned in the discussion for FIG. 4, a confidence interval may be generated based on the likelihood that window damage indicator(s) are present on a given roadway. With the instant example, the apparatus 10 may attribute a confidence score of 0.25 based on the presence of the truck 84 alone on the roadway 70. This score can be based on historical data concerning which vehicles most commonly cause window damage, etc. The fact that there is also loose gravel 86 present on the roadway 70 (confirmed by image data) may be accounted for by the apparatus 10 and used to boost the confidence interval from 0.25 to 0.75 as there is a good chance the truck 84 might kick up the gravel into the window(s) of other cars.

The apparatus 10 may further confirm the presence and location of window damage indicators by monitoring for image data of actual broken vehicle windows. Continuing with this example, if the convertible ignored the route advice 82 and drove behind the truck 84 past the gravel 86 and the tuck did kick/propel a piece of loose gravel into the convertible's windshield the apparatus 10 may identify this via any damage done to the window. If the loose gravel chipped, cracked, or otherwise damaged the convertible's window(s) as the two vehicles pass the loose gravel 86 the apparatus 10 may observe such damage via image data, audio data, etc. The severity of the damage along with other factors may be used to boost or reduce the confidence score mentioned above. In this case, since the gravel damaged the convertible's windshield, the confidence score would be raised as the presence of window damage indicators has been confirmed by actual window damage. The apparatus 10 may generate alerts, provide route guidance, update map layers, and/or implement automatous driving controls in response.

The apparatus 10, in some embodiments, may also monitor for common sources of road debris. In the example above, if the truck 84 was a dump truck hauling gravel or road salt the open back of the dump truck may result in some of the salt, rocks, gravel, etc. being dropped or otherwise exiting the dump truck as the truck drives down a given roadway. The presence of potholes, uneven roadway, large bumps, etc. might exacerbate the amount of salt, rocks, etc. dropped by the dump truck and thus result in a higher likelihood of window damage to surrounding vehicles. Modifying the example above slightly, if the convertible was traveling behind dump truck the apparatus 10 may generate a high confidence score for window damage potential based on the contents of the dump truck's bed (e.g., gravel, salt, etc.). Thus, the apparatus 10 in some examples need not observe actual road debris present on a roadway to generate an alert, route guidance, etc. regarding the risk of window damage.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for providing a vehicle window damage detection system comprising:
   receiving a real time indication of a location of a vehicle via GPS data;
   obtaining image data of at least one vehicle, at least one vehicle window, and road debris;
   determining a window damage indicator based on the obtained image data, wherein the window damage indicator is determined based at least on one or more road debris on a roadway proximate the location of the vehicle; identifying one or more road segments;
   associating the determined window damage indicator with one or more identified road segments to update a map layer of a geographic database;
   generating an automated vehicle control instruction in response to the determined window damage indicator; and wherein the movement of the vehicle is controlled by the generated automated vehicle control instruction.

2. The method according to claim 1, further comprising determining a confidence interval associated with the window damage indicator and updating a map layer with the confidence interval.

3. The method according to claim 1, further comprising updating the confidence interval associated with the determined window damage indicator based at least in part on the severity of damage done to a vehicle windshield.

4. The method according to claim 1, further comprising identifying at least one additional window damage indicator based on road segments similarly situated to the previously identified road segments.

5. The method according to claim 1, further comprising providing an alert in response to the determined window damage indicator to at least one end user device.

6. The method according to claim 1, further comprising obtaining the image data of the window damage indicator from a vehicle camera system.

7. The method according to claim 1, further comprising providing route guidance in response to the determined window damage indicator.

8. An apparatus configured to predict window damage indicators, the apparatus comprising at least one processor and at least one memory storing computer program code, the at least one memory and the computer program code configured to, with the processor, cause the apparatus to at least:
  receive a real time indication of a location of a vehicle via GPS data;
  obtain image data of at least one vehicle, at least one vehicle window, and road debris;
  determine a window damage indicator based on the obtained image data, wherein the window damage indicator is determined based at least on one or more road debris on a roadway proximate the location of the vehicle; identify one or more road segments;
  associate the determined window damage indicator with one or more identified road segments to update a map layer of a geographic database;
  generate an automated vehicle control instruction in response to the determined window damage indicator; and
  wherein the movement of the vehicle is controlled by the generated automated vehicle control instruction.

9. The apparatus according to claim 8, further comprising determining a confidence interval associated with the determined window damage indicator location and updating a map layer with the confidence interval.

10. The apparatus according to claim 9, further comprising updating the confidence interval associated with the determined window damage indicator based at least in part on the severity of damage done to a vehicle windshield.

11. The apparatus according to claim 8, wherein the at least one memory and the computer program code are configured to, with the processor, cause the apparatus to obtain the image data via a vehicle camera system.

12. The method according to claim 1, further comprising obtaining the image data of the contents of a truck bed and determining the window damage indicator based at least in part on the obtained image data of the contents of the truck bed.

13. The method according to claim 1, further comprising obtaining the image data of a construction road sign and determining the window damage indicator based at least in part on the obtained image data of the construction road sign.

14. The method according to claim 1, wherein vehicle movement is controlled by an adjustment to adaptive cruise control, automated braking, or steering.

* * * * *